United States Patent
Wagener

(10) Patent No.: US 7,638,711 B2
(45) Date of Patent: Dec. 29, 2009

(54) BUS BAR SYSTEM WITH ASSEMBLY UNIT CONSISTING OF A BASE PLATE AND FIXING ITEMS

(75) Inventor: Hans Wagener, Dietzhölztal (DE)

(73) Assignee: Rittal GmbH & Co. KG, Herborn (DE)

( * ) Notice: Subject to any disclaimer, the term of this patent is extended or adjusted under 35 U.S.C. 154(b) by 533 days.

(21) Appl. No.: 11/629,112

(22) PCT Filed: Jun. 18, 2005

(86) PCT No.: PCT/EP2005/006595

§ 371 (c)(1),
(2), (4) Date: Dec. 8, 2006

(87) PCT Pub. No.: WO2006/002786

PCT Pub. Date: Jan. 12, 2006

(65) Prior Publication Data

US 2008/0266760 A1 Oct. 30, 2008

(30) Foreign Application Priority Data

Jul. 1, 2004 (DE) .................. 10 2004 031 825

(51) Int. Cl.
*H02G 5/00* (2006.01)
(52) U.S. Cl. .................. 174/72 B; 174/68.1; 174/71 B; 174/88 B; 174/520; 439/207; 439/517; 439/212; 363/144; 361/615
(58) Field of Classification Search ............... 174/68.1, 174/68.3, 520, 559, 72 B, 88 B, 99 B, 129 B, 174/133 B, 71 B, 149 B; 439/76.2, 207, 439/517, 212, 123, 114; 361/600, 611, 614, 361/615, 811; 363/144

See application file for complete search history.

(56) References Cited

U.S. PATENT DOCUMENTS

| | | | | |
|---|---|---|---|---|
| 3,471,629 A | * | 10/1969 | O'Leary | 174/666 |
| 4,462,650 A | * | 7/1984 | Humphreys | 439/209 |
| 5,162,614 A | * | 11/1992 | Bogiel et al. | 174/97 |

(Continued)

FOREIGN PATENT DOCUMENTS

DE    37 14 196 A1    11/1988

(Continued)

*Primary Examiner*—Dhiru R Patel
(74) *Attorney, Agent, or Firm*—Pauley Petersen & Erickson

(57) ABSTRACT

A bus bar system with an assembly unit having a base plate with side limbs and fixing items which are connected to the assembly unit. The assembly unit forms a receiving element for a bus bar holder and bus bars which are covered with cover elements and/or adapters for peripheral devices. The covers and/or adapters are mechanically connected to the bus bars by plug-in receiving elements and/or locking receiving elements and the adapters are also electrically connected to the bus bars. An assembly unit, which can be produced and mounted at low cost without impeding functional requirements, is provided and the assembly unit forms locking receiving elements together with retaining flanges, which protrude at a distance on the outer sides of the side limbs, and fixing flanges, wherein bar-shaped fixing items can be inserted into and/or locked inside the receiving elements. The plug-in and/or locking receiving elements of the covers and/or adapters receive the retaining flanges and the connected side limbs of the bar-shaped fixing items.

13 Claims, 2 Drawing Sheets

U.S. PATENT DOCUMENTS 5,336,849 A * 8/1994 Whitney .................... 174/72 C
5,817,977 A    10/1998 Biermeier et al.
7,563,982 B2 * 7/2009 Kimmel .................... 174/72 B

FOREIGN PATENT DOCUMENTS

| DE | 39 37 371 A1 | 5/1990 |
|----|---|---|
| DE | 93 06 013.0 | 5/1994 |
| EP | 0 926 790 A3 | 6/1999 |
| EP | 0 926 791 A3 | 6/1999 |
| FR | 2 593 973 | 8/1987 |

* cited by examiner

BUS BAR SYSTEM WITH ASSEMBLY UNIT CONSISTING OF A BASE PLATE AND FIXING ITEMS

BACKGROUND OF THE INVENTION

1. Field of the Invention

This invention relates to a bus bar system with an assembly unit including a base plate with lateral legs and fastening elements which are connected with the assembly unit, wherein the assembly unit forms a receiver for bus bar holders and bus bars, which are covered by covers and/or adapters for devices to be connected, the covers and/or adapters are mechanically connected with the assembly unit by plug-in or snap-in receptacles, and the adapters are also electrically connected with the bus bars.

2. Discussion of Related Art

Bus bar systems are known from European Patent Reference EP 0 926 790 A3, European Patent Reference EP 0 926 791 A3 and German Patent Reference DE 93 06 013 U1. Here, the manufacture of the assembly unit from the assembly plate with fastening elements determines the costs of the bus bar system and it is possible to reduce costs if the base plate is combined in one piece with the fastening elements. This requires complicated tools and, for reasons of cost, prevents a production in the form of a cut-to-size section of a profiled continuous piece.

Further attempts for cost reduction employ a base plate for the assembly unit which is designed simpler and can be connected with separately produced fastening elements. However, a considerable assembly cost outlay is still required because the fastening elements must be connected with the base plate over the entire length of the bus bar system, and a fastening element must be attached to each longitudinal side of the base plate.

SUMMARY OF THE INVENTION

It is one object of this invention to reduce manufacturing costs for the assembly unit of a bus bar system of the type mentioned above, with a base plate and a fastening element produced as simple elements, which can be connected with each other by the most simple assembly without interfering with the requirements made on the assembly unit.

In accordance with this invention, this object is attained with holding flanges and fastening flanges extending away from the exteriors of the lateral legs. The assembly unit forms snap-in receivers, into which bow-shaped fastening elements can be plugged and/or snapped, wherein the plug-in and/or snap-in receivers of the covers and/or adapters receive the holding flanges and the lateral legs of the bow-shaped fastening elements are therewith connected.

One advantage is that both parts, the base plate and the fastening element, can be produced in the form of simple profiled extruded elements and can be cut to any desired length. An identical fastening element can be used for both longitudinal sides of the base plate if the base plate is mounted and rotated by 180°. The covers and the device adapters can be used unchanged with the plug-in and/or snap-in receivers if the holding flanges of the base plate with the connected lateral legs of the fastening elements are designed as counter-elements for the plug-in and/or snap-in receivers of the covers and/or adapters.

The snap-in connection between the base plate and the fastening element is formed if the lateral legs of the fastening elements facing the fastening flanges of the assembly plate have a snap-in protrusion, which snaps into a snap-in receiver of the adjoining top of the fastening flange of the base plate.

The fastening elements are temporarily fixed in place in the receiver of the base plate if the holding flanges which are spaced apart from the base plate have snap-in legs on the free ends, which are oriented toward the base plate and have on the sides facing the exteriors of the lateral legs plug-in receivers for the ends of the lateral legs of the fastening elements embodied as plug-in tips.

The snap-in connection can be easily achieved after fixing in place if the snap-in protrusion at the lateral leg of the fastening element has a thickness, which continuously increases in the plug-in and/or snap-in direction and snaps into a snap-in receiver of a depth which decreases in this direction in the facing top of the fastening flange of the base plate.

In accordance with a further embodiment, the final snap-in position of the fastening elements in the receivers of the base plate is further fixed in place if the lateral legs of the fastening elements facing the fastening flanges of the base plate have a contact section which, with the fastening element plugged or snapped in, makes contact with the front face of the fastening flange and terminates the plug-in and/or snap-in movement. The plugged-in and/or snapped-in fastening elements can rest with a contact leg against the exteriors of the lateral legs of the base plate, and the contact leg connects the lateral legs of the fastening element with each other.

In a further embodiment, contact sections of the fastening elements make a transition into extended sections which adjoin the fastening flanges of the base plate and terminate flush with the outer fastening side of the base plate, and the extended sections of the fastening elements can be used for fastening the assembly unit on a fastening surface.

BRIEF DESCRIPTION OF THE DRAWINGS

This invention is explained in greater detail in view of an exemplary embodiment represented in the drawings, wherein.

DESCRIPTION OF PREFERRED EMBODIMENTS

Figure 1:
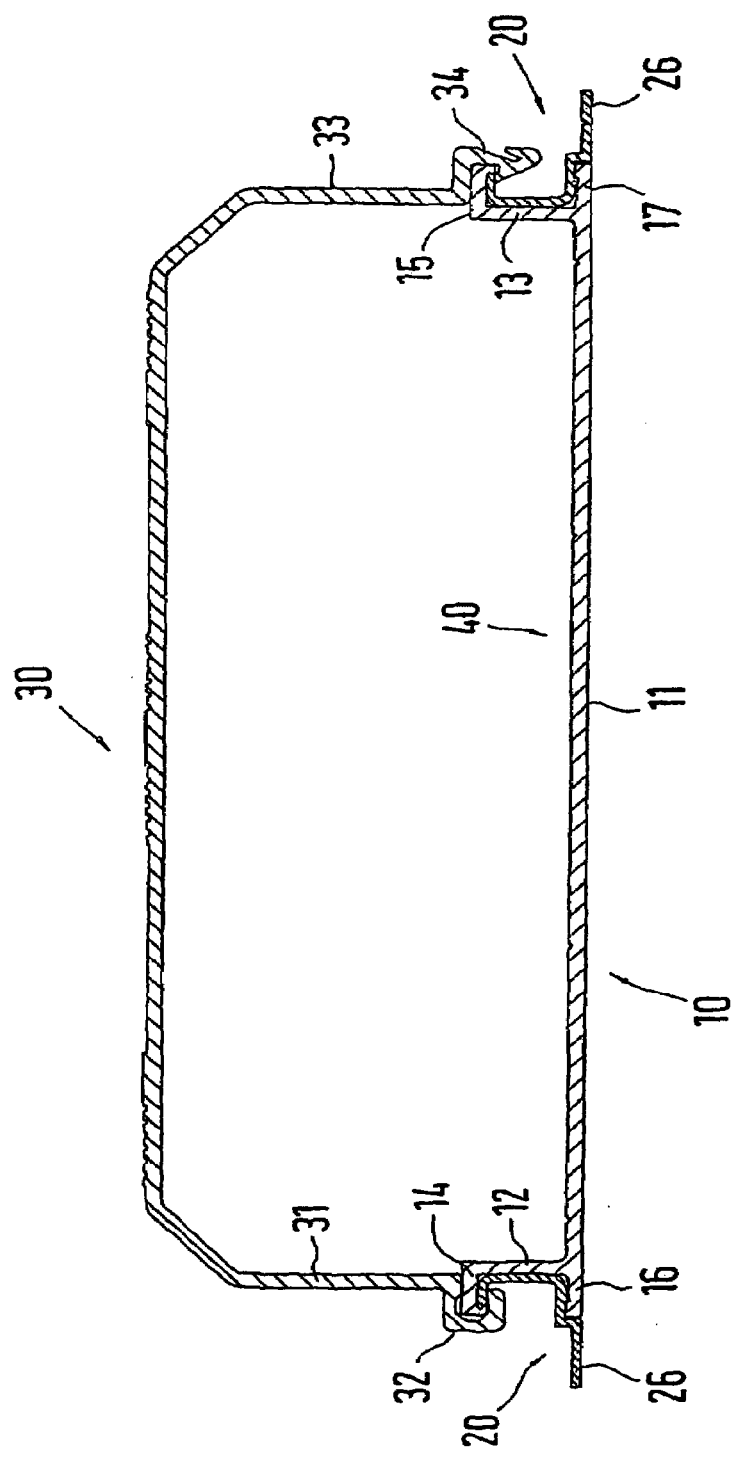
FIG. 1 shows an assembly unit put together from a base plate and two fastening elements and covered with a cover, in a cross-sectional view.

As the cross-sectional view in FIG. 1 shows, the base plate 11 with the two upward oriented lateral legs 12 and 13 forms a receiver 40 in a known manner, which extends over a defined length. This base plate 11 with the lateral legs 12 and 13, as well as holding flanges 14 and 15 projecting away from the exteriors of the lateral legs 12 and 13, as well as fastening flanges 16 and 17, is cut to a desired size from a profiled continuous piece.

Two-piece bus bar holders, in which bus bars are fixed in place, are inserted into the receiver 40. The unit including bus bars and bus bar holders is placed in a known manner into the receiver 40 of the assembly unit 10 and is therein fixed in place. It is thus not necessary to address the details of the fixation in place within the framework of this invention. New in connection with the assembly unit 10 is the application of the two fastening elements 20 on the two longitudinal sides of the base plate 11, which will be explained in detail when describing the partial cross sections in accordance with FIGS. 2 and 3.

In connection with FIG. 1, the fastening elements 20 connected with the lateral legs 12 and 13 extend fastening flanges 16 and 17 of the base plate 11 by extension sections 26 and can be used for fastening the assembly unit 10 on a fastening surface. Thus the extension sections 26 of the fastening elements 20 can also terminate flush with the underside of the base plate 11.

Figure 2:
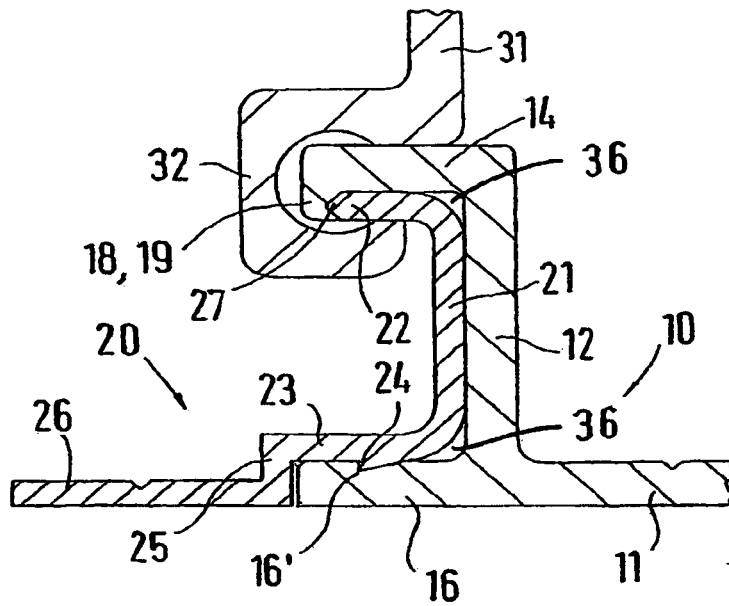
FIG. 2 shows a connection between the base plate and the fastening element on the left longitudinal side of the assembly unit in accordance with FIG. 1, in an enlarged partial cross section view, wherein the application of the cover is also represented.
Figure 3:
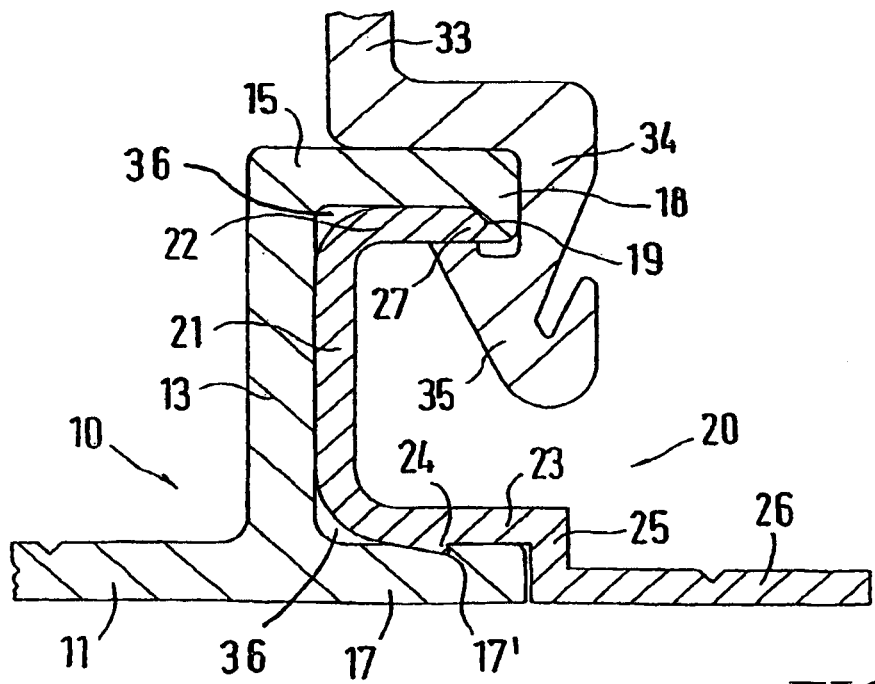
FIG. 3 shows a connection between the base plate and the fastening element on the right longitudinal side of the assembly unit in accordance with FIG. 1, in an enlarged partial cross section view, together with the application of the cover or of an adapter.

As the partial cross section in accordance with FIG. 2 shows, the holding flange 14 and the fastening flange 16 at the lateral leg 12 of the base plate 11 form a rectangular receiver 36 on the exterior of the lateral leg 12. A bow-shaped fastening element 20 is pushed into and snapped in this receiver 36. At the end, the holding flange 14 has a snap-in leg 18, which is oriented toward the fastening flange 16 and has a plug-in receiver 19 on the inside facing the lateral leg 12. The plug-in tip 27 formed on the end of the lateral leg 22 of the fastening element 20 is inserted into the plug-in receiver 19. Then the lateral leg 23 is pivoted more and more into the receiver of the base plate 10, wherein the lateral leg 23 of the fastening element 20 slides on the top of the fastening flange 16 until the snap-in protrusion 24 formed on the lateral leg 23 snaps into the snap-in receiver 16' of the fastening flange 16 and finally fixes the prelocated fastening element 20 in place. The snap-in protrusion 24 increases in thickness in the plug-in and snap-in direction, while the depth of the snap-in receiver 16' is reduced in the same direction. These embodiments of the snap-in protrusion 24 and the snap-in receiver 16' assure the unequivocal holding of the fastening element 20 on the base plate 11.

Also, the plug-in or snap-in movement is limited by a contact section 25 on the lateral leg 23 of the fastening element 20 when it contacts the front face of the fastening flange 16. Simultaneously, the contact leg 21 comes to rest against the exterior of the lateral leg 12, as shown by the end position in accordance with FIG. 2.

The lateral leg of a cover 30 is indicated by 31 and terminates in a plug-in receiver 32. The entry opening of the plug-in receiver 32 is matched to the dimension of the holding flange 14 with the lateral leg 22 of the fastening element 20 with the lateral leg 22 inserted. If the plug-in receiver 32 is preselected, the holding flange 14 with the lateral leg 22 is matched to the plug-in receiver 32. The novel assembly unit 10 can then be matched to existing bus bar systems with covers and adapters.

An identical fastening element 20 can be fastened in the same way on the right longitudinal side of the base plate 11 with the lateral leg 13. The holding flange 15 of the lateral leg 13 has on the end the snap-in leg 18, which in turn supports the plug-in receiver 19 and receives the snap-in tip 27 on the end of the lateral leg 22 of the fastening element 20 and fixes it in place. The snap-in protrusion 24 of the fastening element 20 snaps into a snap-in receiver 17' of the fastening flange 17 of the base plate 11. The contact section 25, the contact leg 21 and the extension section 26 of the fastening element 20 assume the same functions as in the connection on the left side of the assembly unit 10.

The lateral leg 33 of the cover 30, or the corresponding side of the adapter, terminate in a snap-in receiver 34, in a known manner. A part formed on the snap-in receiver 34 forms a snap-in incline 35, so that, following the completion of the left plug-in connection, the cover 30, or the adapter, can be snapped with the plug-in receiver 32 on the right side from above onto the holding flange 22 with the inserted lateral leg 22 of the fastening element 20 on the right side.

The invention claimed is:

1. A bus bar system and a variety of bow-shaped fastening elements connected with an assembly unit (10) comprising a base plate (11) with lateral legs (12, 13) and fastening elements (20) connected with the assembly unit (10), the assembly unit (10) forming a receiver (40) for bus bar holders and bus bars covered by at least one cover (30), the at least one cover (30) mechanically connected with the assembly unit (10) by a plug-in receiver (32) and a first snap-in receiver (34) of the at least one cover (30), the bus bar system comprising:
a variety of holding flanges (14, 15) and a variety of fastening flanges (16, 17), each said flange extending away from an exterior of each of the lateral legs (12, 13) forming second snap-in receivers (36) into which the bow-shaped fastening elements (20) are snapped, and the plug-in receiver (32) and the first snap-in receiver (34) of the at least one cover (30) receiving the holding flanges (14, 15) and second lateral legs (22) of the connected bow-shaped fastening elements (20).

2. The bus bar system in accordance with claim 1, wherein third lateral legs (23) of the fastening elements (20) facing the fastening flanges (16, 17) of the base plate (11) have a snap-in protrusion (24) which snaps into a second snap-in receiver (16', 17') of an adjoining top of the fastening flange (16, 17) of the base plate (11).

3. The bus bar system in accordance with claim 2, wherein the snap-in protrusion (24) has a thickness which continuously increases in a snap-in direction and snaps into the second snap-in receiver (16', 17') of a depth which decreases in the snap-in direction.

4. The bus bar system in accordance with claim 3, wherein the holding flanges (14, 15) are spaced apart from the base plate (11) and have snap-in legs (18) on free ends oriented toward the base plate (11) and have one side facing one of the exteriors of the lateral legs (12, 13) and third plug-in receivers (19) for ends of the second lateral legs (22) of the fastening elements (20) formed as plug-in tips (27).

5. The bus bar system in accordance with claim 4, wherein the third lateral legs (23) of the fastening elements (20) facing the fastening flanges (16, 17) of the base plate (11) have a contact section (25) which contacts a front face of the fastening flange (16, 17) and terminates a snap-in movement.

6. The bus bar system in accordance with claim 5, wherein the snapped-in fastening elements (20) rest with a contact leg (21) against the exteriors of the lateral legs (12, 13) of the base plate (11), and the contact leg (21) connects the second lateral leg (22) and the third lateral leg (23) of the fastening element (20) with each other.

7. The bus bar system in accordance with claim 6, wherein the contact sections (25) of the fastening elements (20) transition into extended sections (26) which adjoin the fastening flanges (16, 17) of the base plate (11) and terminate flush with an outer fastening side of the base plate (11).

8. The bus bar system in accordance with claim 7, wherein the holding flanges (14, 15) of the base plate (11) with the connected second lateral legs (22) of the fastening elements (20) are formed as counter-snap-in elements for the plug-in receiver (32) and the first snap-in receiver (34).

9. The bus bar system in accordance with claim 1, wherein the holding flanges (14, 15) are spaced apart from the base plate (11) and have snap-in legs (18) on free ends oriented toward the base plate (11) and have one side facing one of the exteriors of the lateral legs (12, 13) and third plug-in receivers (19) for ends of the second lateral legs (22) of the fastening elements (20) formed as plug-in tips (27).

10. The bus bar system in accordance with claim 1, wherein third lateral legs (23) of the fastening elements (20) facing the fastening flanges (16, 17) of the base plate (11) have a contact section (25) which contacts a front face of the fastening flange (16, 17) and terminates a snap-in movement.

11. The bus bar system in accordance with claim 10, wherein the snapped-in fastening elements (20) rest with a contact leg (21) against the exteriors of the lateral legs (12, 13) of the base plate (11), and the contact leg (21) connects the second lateral leg (22) and the third lateral leg (23) of the fastening element (20) with each other.

12. The bus bar system in accordance with claim 10, wherein the contact sections (25) of the fastening elements (20) transition into extended sections (26) which adjoin the fastening flanges (16, 17) of the base plate (11) and terminate flush with an outer fastening side of the base plate (11).

13. The bus bar system in accordance with claim 1, wherein the holding flanges (14, 15) of the base plate (11) with the connected second lateral legs (22) of the fastening elements (20) are formed as counter-snap-in elements for the plug-in receiver (32) and the first snap-in receiver (34).

* * * * *